Dec. 20, 1949 J. H. BREWSTER, III 2,491,549
HELICOPTER
Filed Jan. 24, 1945
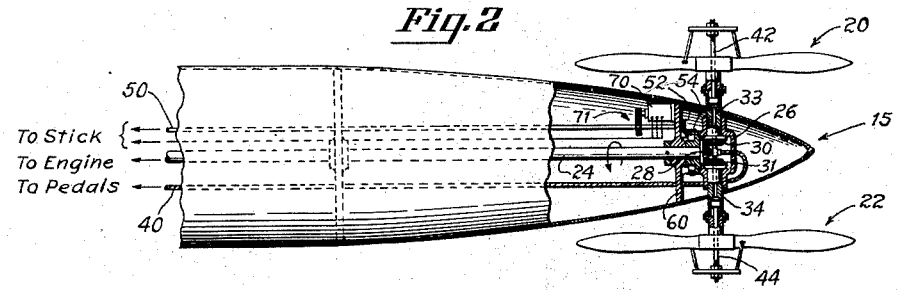
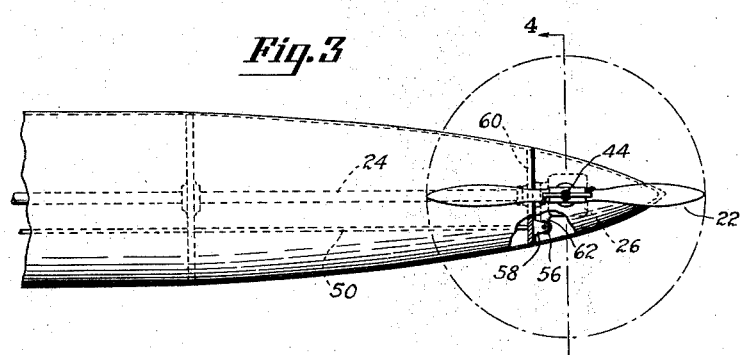
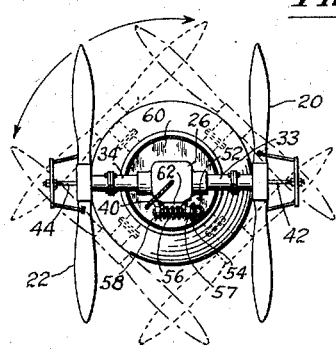
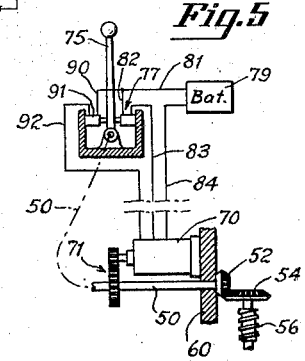
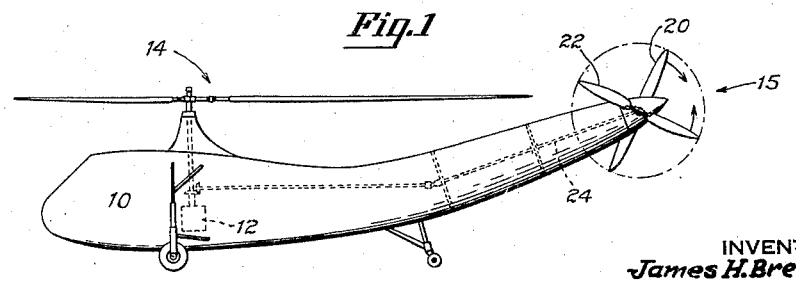
INVENTOR
James H. Brewster, III
BY
*Gifford J. Holmes*
AGENT.

Patented Dec. 20, 1949

2,491,549

UNITED STATES PATENT OFFICE 2,491,549

HELICOPTER

James H. Brewster, III, West Hartford, Conn., assignor to United Aircraft Corporation, East Hartford, Conn., a corporation of Delaware Application January 24, 1945, Serial No. 574,350

5 Claims. (Cl. 170—135.22)

This invention relates to helicopters and more particularly to a system for controlling the attitude of the craft about its longitudinal and transverse axes, and for providing a lift vector from the tail rotor.

Under certain conditions in flight and hovering, due to gusts of air and to aerodynamic actions, the craft may yaw and pitch. The main sustaining rotor will compensate such actions in most cases if they are transitory. However, if the conditions persist somewhat longer, it becomes necessary to incline the main rotor's plane of rotation to compensate for the same. Such inclination will reduce the action of the rotor in sustaining and propelling the craft and necessitate adjustment thereof, which adjustment will reflect back to "over control" the first mentioned compensating action.

It is, therefore, an object of this invention to provide means to control the attitude of a helicopter by varying the pitch and/or direction of thrust of the counter torque resisting propeller.

A further object is to operate a pair of oppositely rotating auxiliary propellers in the manner set forth in the preceding object to offset possible gyroscopic effects.

A still further object is to provide devices as set forth in the preceding objects with auxiliary power means for aiding in accomplishing the actions stated.

Another object is to provide means for accomplishing any of the purposes set forth in the preceding objects, and to also augment the lift of the system.

The foregoing, and other objects, will be apparent or pointed out in the accompanying specification and claims.

In the drawings, Fig. 1 is an elevation of a helicopter including my invention upon the empennage thereof.

Fig. 2 is a plan view of my invention.

Fig. 3 is a detailed elevation of the empennage.

Fig. 4 is a sectional view taken along the lines 4—4 of Fig. 3, and

Fig. 5 is a diagrammatic view of the control arrangement.

In Fig. 1 a helicopter 10 is provided with a motor and clutch arrangement 12 for driving a rotor assembly 14 and the counter torque resisting empennage structure generally indicated at 15 through shafting 24 shown in broken lines. As the rotor 14 is turned in the air by the motor 12, there is a torque reaction exerted upon the craft 10 which tends to rotate the same in a direction opposite to the direction of rotation of the rotor 14. The torque compensating, or auxiliary rotor structure 15, is arranged so that it may exert a thrust resisting the rotation of the body 10.

Referring to Fig. 2, the auxiliary propeller system 15 comprises a first rotor 20 and a second rotor 22 which are arranged to turn in opposite directions to cancel the gyroscopic moments of each. It will be understood, however, that a single rotor may be employed in the event that gyroscopic effects are not excessive, as on a small craft for example. The drive shafting 24 is connected at its forward end by suitable connections to the motor and extends at its other end into a gear box 26. A bevel gear 28 on the aft end of shafting 24 meshes with gears 30 and 31 that rotate shafts 33 and 34 respectively for turning the propellers 20 and 22 respectively. With such an arrangement the propeller 20 will turn in a direction opposite to the direction of rotation of the propeller 22.

A control cable 40 extends to a servo-motor or to the pedals in the cockpit at one end, not shown, and at its other end connects to a pitch adjusting means within the gear box 26 to change the position of rods 42 and 44 to vary the pitch of propellers 20 and 22, respectively, to change the thrust of the propellers. This structure has not been shown in detail herein, but may be the same as the structure shown in U. S. Patent No. 2,318,259 for Direct-lift aircraft, issued May 4, 1943, to Igor I. Sikorsky.

In order to control for pitching moments which affect the aircraft, I have provided means for rotating the planes of rotation of the auxiliary propellers 20 and 22 around the horizontal or longitudinal axis of the empennage portion of the craft 10. A rotatable control rod 50 may extend to the joy stick on the one end, as diagrammatically shown in Fig. 5 or may in other cases extend to a separate controlling member. The control rod 50 has a bevel gear 52 at its other end which meshes with a second bevel gear 54 for rotating a worm 56, as shown in Fig. 4. The worm 56 is secured by lugs 57 and 58 to a plate 60 which forms a rear wall of the empennage. A gear toothed quadrant 62 is fixed with relationship to the gear box 26. The gear box 26 is rotatably mounted upon the end of the drive shaft 24 so that it may rotate therearound. Thus, as the worm 56 is turned, the toothed quadrant 62 will be rotated to rotate the entire gear box 26 to also rotate the plane of rotation of the propellers 20 and 22 to change the direction of the thrust exerted thereby. The range of movement has been indicated in Fig. 4 in dotted lines as being substantially 45° in either direction. It will be understood, however, that any suitable degree of movement may be provided for the propellers for different uses therefor.

To aid in the operation of rotating the plane of rotation of the propellers 20 and 22, a servo-motor 70 is provided. This servo-motor 70 may be mounted upon the end plate 60 of the empennage and be geared to suitable reduction gearing 71 connected to the control shaft 50. As shown in Fig. 5, the servo-motor 70 is under the control of a control rod 75 which is located in the cockpit. As the control rod 75 is moved, it may vary the energization of the motor 70 so that it will turn in one direction or the other. As the control rod 75 is moved to the right, it will complete a circuit through the switching mechanism 77 so that an energizing circuit for the motor 70 may be traced from a battery 79 through wires 81, 82, 83, the motor 70, and the wire 84 back to the battery 79. With such a circuit, the servo-motor 70 will rotate the rod 50 for rotating the plane of rotation of the propellers 20 and 22 in the same direction that the control stick 75 would move the same. When the control stick 75 is moved to the left, a circuit for the motor 70 will be completed from the battery 79 through wire 81, wire 90, switch 91, wire 92, a second, or reversed, winding in the motor 70, not shown, and wire 84 back to the battery 79. This latter circuit will cause the plane of rotation of the auxiliary propellers 20 and 22 to be rotated in the opposite direction from that described when the first named circuit is energized.

In operation, as the craft 10 is moving through the air, the pitch of the propellers 20 and 22 will be adjusted to counteract the torque which tends to rotate the craft 10. However, if due to prevailing conditions, the tail tends to move up and down, or pitch, there is no effort exerted besides resistance of movement of the fuselage to correct such movement when the tail propellers are in vertical position. With the present invention, the plane of rotation of these propellers may be rotated so that a resultant thrust thereof will extend in some other direction than in the horizontal. Thus, as the tail pitches upwardly, the auxiliary rotors may be rotated around their longitudinal axis to exert a thrust downwardly to oppose this upward pitching movement. Conversely, when the pitch is downward, the auxiliary rotors may be rotated to exert a thrust upward to oppose this pitching movement. Concurrently with either of the above adjustments, with my invention it is possible to change the pitch of the auxiliary rotor blades so that the horizontal component may remain substantially constant. Furthermore, at all times, the rear rotors can, by virtue of a change in plane of thrust, contribute to the lift of the main rotor.

In high speed flight, the yawing moments of the helicopter will be substantially entirely damped out by the fuselage. Under such conditions, the plane of rotation of the torque-resisting propeller can be made substantially horizontal so that the thrust will be downward to contribute to the lift of the helicopter. Under such conditions, the pitching movements of the helicopter can be controlled by variation of the pitch of the auxiliary rotor. Thus, under high speed flight conditions, the auxiliary rotor can be made to contribute to the lift of the helicopter and thus improve its performance.

While I have described my invention as incorporating two oppositely rotating propellers which will act so as to exert no gyroscopic moment upon the aircraft and for increasing the solidity and thrust thereof, it will be understood that the principles of this invention could be employed equally well with but a single propeller. While I have described the propellers of being changeable only in total pitch, it will be understood that these could be of cyclic pitch as well in a manner well known in the art. It is also obvious that many other changes and modifications could be made in the present invention. Therefore, I wish not to be limited in my invention only to that particular form shown and described, but by the scope of the appended claims.

I claim:

1. In a helicopter including a sustaining rotor, a motor therefor, and a body, the combination of means for resisting rotor torque reaction, contributing to the lift of the main rotor, and controlling pitching comprising a pair of auxiliary propellers, means for rotating said propellers in opposite directions, means for adjusting the pitch of said propellers, and control means for rotating the planes of rotation of said propellers about a substantially horizontal axis.

2. The combination of claim 1, and a servo-motor cooperable with said control means.

3. In a helicopter having an engine, a tail rotor, driving means including a substantially horizontal shaft connected between said rotor and the engine, means for rotating said rotor around the axis of said shaft to change the direction of thrust thereof, means for controlling the pitch of said rotor, and a servo-motor cooperable with said rotating means.

4. In a helicopter including a sustaining rotor, a body having an empennage, and a motor for driving said rotor, the combination of means for controlling the attitude of the helicopter comprising two propellers carried by said empennage and disposed on opposite sides of said body, means for driving said propellers from said motor in opposite directions including drive shafting extending from said motor aft to said empennage, a hub carried by said empennage and rotatable about a fore and aft axis, oppositely extending lateral drive shafts carried by said hub and supporting said propellers, and manually operable means for rotating said hub about said fore and aft axis to change the direction of thrust of said propellers.

5. In a helicopter including a sustaining rotor, a body having a tail cone, and a motor for driving said rotor, the combination of means for controlling the attitude of the helicopter comprising a gear box mounted on said tail cone and rotatable about an axis extending fore and aft of the helicopter, a pair of opposed laterally extending propeller shafts mounted in said gear box having beveled gears on their adjacent ends within said box, propellers carried by said shafts, means for driving said propeller shafts in opposite directions from said motor including a drive shaft extending into said gear box and lying on the axis of rotation of the latter, said drive shaft having a beveled gear on its aft end within said box meshing with the beveled gears on said propeller shafts, and manually operable means for rotating said gear box and said propeller shafts as a unit about said axis to change the direction of thrust of said propellers.

JAMES H. BREWSTER, III.

(References on following page)

REFERENCES CITED

The following references are of record in the file of this patent:

UNITED STATES PATENTS

| Number | Name | Date |
|---|---|---|
| 848,055 | Schwabek | Mar. 26, 1907 |
| 1,344,297 | Fedders | June 22, 1920 |
| 1,635,897 | Nelson | July 12, 1927 |
| 1,779,524 | Zaschka | Oct. 28, 1930 |
| 1,890,931 | Briner | Dec. 13, 1932 |
| 1,960,141 | D'Ascanio | May 22, 1934 |
| 2,130,918 | Stefano | Sept. 20, 1938 |
| 2,225,002 | Focke | Dec. 17, 1940 |
| 2,277,378 | Wells | Mar. 24, 1942 |
| 2,369,652 | Avery | Feb. 20, 1945 |
| 2,378,617 | Burke | June 16, 1945 |
| 2,385,889 | Skavinsky | Oct. 2, 1945 |
| 2,394,513 | De Chappedelaine | Feb. 5, 1946 |
| 2,415,622 | Bossi | Feb. 11, 1947 |

FOREIGN PATENTS

| Number | Country | Date |
|---|---|---|
| 10,620 | Great Britain | of 1897 |
| 292,018 | Italy | Dec. 31, 1931 |